(12) United States Patent
Vander Kamp et al.

(10) Patent No.: US 6,408,394 B1
(45) Date of Patent: Jun. 18, 2002

(54) SYSTEM AND METHOD FOR APPLYING INITIALIZATION POWER TO SCSI DEVICES

(75) Inventors: Kerry B. Vander Kamp, Tomball; Edward J. Chen, Houston, both of TX (US)

(73) Assignee: Compaq Computer Corp., Houston, TX (US)

(*) Notice: Subject to any disclaimer, the term of this patent is extended or adjusted under 35 U.S.C. 154(b) by 0 days.

(21) Appl. No.: 09/790,446

(22) Filed: Feb. 21, 2001

Related U.S. Application Data

(62) Division of application No. 09/195,306, filed on Nov. 18, 1998, now Pat. No. 6,233,625.

(51) Int. Cl.$^7$ .............................. G06F 1/26; G06F 1/28; G06F 1/30
(52) U.S. Cl. ........................... 713/300; 710/104; 710/8
(58) Field of Search ................................. 713/300–340; 710/8–19, 104

(56) References Cited

U.S. PATENT DOCUMENTS

| | | | |
|---|---|---|---|
| 5,367,647 A | 11/1994 | Coulson et al. | |
| 5,535,400 A | * 7/1996 | Belmont | ..................... 713/330 |
| 5,586,271 A | 12/1996 | Parrett | |
| 5,598,538 A | 1/1997 | Cooper | |
| 5,634,081 A | 5/1997 | Krakirian | |
| 5,640,593 A | 6/1997 | Krakirian | |
| 5,721,880 A | 2/1998 | McNeill, Jr. et al. | |
| 5,845,154 A | 12/1998 | Krakirian | |
| 5,961,613 A | 10/1999 | DeNicola | |
| 5,968,147 A | 10/1999 | Polfer et al. | |
| 6,035,384 A | 3/2000 | Tuma et al. | |
| 6,058,436 A | 5/2000 | Kosco | |
| 6,061,752 A | 5/2000 | Jones et al. | |
| 6,233,693 B1 | * 5/2001 | Berglund et al. | ........... 713/340 |

* cited by examiner

Primary Examiner—Rupal Dharia
(74) Attorney, Agent, or Firm—Kevin L. Daffer; Conley, Rose & Tayon P.C.

(57) ABSTRACT

A computer is provided having a SCSI subsystem and multiple SCSI devices connected to that subsystem. Those devices involve electromechanical motors which require a greater amount of current during times needed to spin-up the motor-driven devices to a steady-state velocity than current needed to maintain that velocity. Each SCSI device includes an inquiry page indicating attributes of that device and whether that device supports fast spin-up. If a device supports fast spin-up, firmware within the computer is activated during ROM POST operations forwards a command to begin a spin-up operation on one SCSI device before the prior device has completed its spin-up operation. In this manner devices which support fast spin-up can concurrently spin-up to their constant velocity value so as to minimize the initialization process of the computer system subsequent to reset or boot-up of the system. Any devices which do not support fast spin-up, as indicated in their inquiry page, can thereafter be spun-up in sequence one after the other to complete the boot-up process for the entire computer system employing numerous SCSI disk drives or tape back-up units.

7 Claims, 6 Drawing Sheets

| BIT BYTE | 7 | 6 | 5 | 4 | 3 | 2 | 1 | 0 | |
|---|---|---|---|---|---|---|---|---|---|
| 0 | \multicolumn{4}{c}{PERIPHERAL QUALIFIER = 0h} | | | | | PERIPHERAL DEVICE TYPE = 00h | |
| 1 | \multicolumn{8}{c}{PAGE CODE = D0h} | |
| 2 | \multicolumn{8}{c}{RESERVED} | |
| 3 | \multicolumn{8}{c}{PAGE LENGTH = 10h} | |
| 4 | (MSB) | \multicolumn{7}{c}{QUEUE DEPTH} | |
| 5 | | | | | | | | (LSB) | |
| 6 | \multicolumn{8}{c}{MULTI INITIATOR REVISION} | |
| 7 | \multicolumn{7}{c}{RESERVED} | FSU | ← 36 |
| 8 | \multicolumn{8}{c}{MAXIMUM SPIN-UP CURRENT} | ← 32 |
| 9 | \multicolumn{8}{c}{OPTIMAL IDLE TIME} | ← 34 |
| 10 - 19 | \multicolumn{8}{c}{RESERVED} | |

FIG. 2

| BIT BYTE | 7 | 6 | 5 | 4 | 3 | 2 | 1 | 0 | |
|---|---|---|---|---|---|---|---|---|---|
| 0 | \multicolumn{8}{c}{OPERATION CODE (18H)} | |
| 1 | \multicolumn{3}{c}{LOGICAL UNIT NUMBER} | \multicolumn{4}{c}{RESERVED} | | IMMED | ← 42 |
| 2 | \multicolumn{8}{c}{RESERVED} | |
| 3 | \multicolumn{8}{c}{RESERVED} | |
| 4 | \multicolumn{6}{c}{RESERVED} | LoEj | START | |
| 5 | \multicolumn{8}{c}{CONTROL} | |

FIG. 3

SYSTEM AND METHOD FOR APPLYING INITIALIZATION POWER TO SCSI DEVICES

This is a divisional application from prior application Ser. No. 09/195,306 filed Nov. 18, 1998. Now U.S. Pat. No. 6,233,625.

BACKGROUND OF THE INVENTION

1. Field of the Invention

This invention relates to a computer which contains read only memory ("ROM") based executable instructions which minimize the amount of time needed to initialize power to small computer system interface ("SCSI") devices by employing SCSI controllers which support a fast spin-up mode within their inquiry page and, in response to a start spin-up command, immediately release control of the SCSI bus to other SCSI disk drives to allow a controlled number of SCSI disk drives to concurrently spin-up.

2. Description of the Related Art

SCSI is a well-known term, and is generally referred to as a system-level interface that provides an expansion bus onto which SCSI devices can be coupled. SCSI bus protocol beneficially allows exchange of data among two SCSI devices without the intervention of the host computer processor. SCSI-I architecture allows up to seven SCSI devices to be coupled onto the SCSI bus and linked to a single SCSI port, or SCSI adapter. A newer SCSI-II standard allows an increase in addressing of up to fifteen SCSI devices coupled to a single SCSI adapter via a single SCSI bus. Thus, instead of using an 8-bit bus, SCSI-II uses either 16 or 32 data lines, wherein each line is dedicated to a specific SCSI initiator and SCSI target.

There may be numerous types of SCSI devices which can operate as a peripheral device linked to a computer system. For example, there are tape drives or hard disk drives which operate from the standard SCSI bus protocol, and which are compatible with personal computers or network servers which employ numerous SCSI adapters and associated SCSI devices. In computers which place an emphasis on massive storage devices, multiple SCSI hard disk drives may be contained within a single computer chassis. For example, modem servers may utilize multiple hard disk drives and, due to the performance benefit of SCSI, most of those servers employ SCSI hard disk drives and/or tape drives.

The electromechanical motors which drive SCSI devices consume a greater amount of power and/or current when they are first turned on. This means that the initial power consumption is quite large relative to subsequent steady state power and/or current. When a SCSI disk drive is powered up, surge current spikes are caused by inrush current required by the disk drive while its power filter capacitors are charging and during the initial "spin-up" of its drive motor. SCSI disk drives typically share a common power supply provided throughout the SCSI bus. Inrush current can therefor cause the common power supply to drop out of regulation, thereby causing a voltage spike and possibly degrading data being transferred by other disk drives sharing the SCSI bus. It is for this reason that initial spin-up current to the disk drives must be carefully monitored to prevent data transfer errors or to prevent current draw from exceeding the maximum allowable current draw (i.e., "budget") of the computer system. In an effort to control current draw during spin-up, conventional SCSI protocol provides for sequential spin-up of multiple SCSI devices, whereby two SCSI devices are never spun-up at the same time.

A conventional spin-up process involves applying an initial amount of power to activate the electromechanical motor. That spin-up power [in] is quantified as an amount needed to bring the electromechanical motor from a standstill to a steady state rotational amount. Once steady state rotation is achieved, the current spike on the common power supply is reduced so that another disk drive can now be spun-up. By sequentially applying power to SCSI devices during initialization of the computer, undue spiking on the common power supply is minimized and brought within tolerable limits.

An unfortunate aspect of sequentially initializing a SCSI subsystem is the exorbitant amount of time spent waiting for SCSI devices to spin-up. As SCSI hard drives become larger and as computer systems (e.g., servers) support more drives, the problem is compounded. For example, a large portion of ROM power-on self test ("POST") time is spent initializing the SCSI subsystem which, in instances where a server is employed, initialization can take possibly 30 minutes or longer to spin-up all the drives in sequence and complete the ROM POST.

An improvement is needed in the process of initializing power to SCSI devices. That improvement must be one which can minimize the time needed to spin-up multiple electromechanical SCSI device motors during the reset or boot sequence of a computer. If improvements to the spin-up time can be achieved, operators of large server systems will be less likely to become impatient and contact the manufacturer falsely believing an error has occurred during boot-up.

SUMMARY OF THE INVENTION

The problem outlined above are in large part solved by a computer hereof which employs a fast spin-up routine. The computer thereby includes at least one SCSI bus and multiple SCSI devices coupled to that bus. Depending on an acceptable level of current draw, many of the SCSI devices can be spun-up concurrently. This means that a subset of SCSI devices which support fast spin-up can receive spin-up power and/or current at the same time. As a result, that set of SCSI devices can thereby conclude their spin-up rather quickly, thus allowing additional SCSI devices to be spun-up concurrently.

The present computer includes system memory, and further includes ROM. Within the architecture of the ROM are firmware modifications employed within the SCSI device controller and the host system itself. Placed within the SCSI device firmware are three new fields implemented within a SCSI inquiry page. The three new fields include bits indicating fast spin-up, maximum spin-up current, and optimal idle time. Fast spin-up indicates whether the SCSI device associated with the inquiry page supports fast spin-up (i.e., whether mastership of the SCSI bus can be immediately released after spin-up is initiated). Fast spin-up can be set by a single bit such that if the fast spin-up bit is present (or set) the SCSI bus initiator will know to release mastership immediately after sending a command to initiate start-up (i.e., the start unit command). The maximum spin-up current specifies the maximum amount of current consumed by that particular SCSI device during a spin-up procedure. Multiple bits are used to specify the maximum spin-up current in, for example, one-tenth ampere increments. Optimal idle time specifies the amount of time needed to complete spin-up and achieve steady state power draw without involving any error recovery. Similar to the maximum spin-up current, optimal idle time can be specified by multiple bits used to indicate time increments (e.g., one-tenth of a second increments).

The system memory ROM within the host computer can then scan the SCSI subsystem for drives which support the fast spin-up feature. Essentially, the system ROM will examine for the fast spin-up bit within the inquiry page of each SCSI device. The SCSI devices which have the fast spin-up bit set are then placed in a category separate from SCSI devices which do not support fast spin-up (i.e., legacy devices). Knowing the devices which support fast spin-up, system ROM will then start spinning a device in the fast spin-up category using a start unit command and setting an immediate bit within the start unit command. The immediate bit will release mastership of the SCSI bus so that another start unit command can be issued to another SCSI device to begin its spin-up. This process continues until the computer system's current budget is reached. At this point, the system ROM will wait for each device's optimal idle time to elapse before reclaiming the current allotment for that particular SCSI drive. Reclaiming current allotment involves subtracting the current associated with that drive from the accumulated current amount used by the other drives whose optimal idle time has not elapsed. Based on the cumulative current consumed by the devices which are currently undergoing spin-up, the cumulative current value is compared to the system budget to determine if another drive which support fast spin-up can be initiated. After all fast spin-up devices have completed [spun-up] spin-up, any remaining legacy SCSI device can then be spun-up one-by-one, according to conventional legacy spin-up routines.

According to one embodiment, a computer system is provided. The computer system includes a SCSI bus and a plurality of SCSI disk drives coupled to the SCSI bus. A SCSI adapter is coupled between a peripheral bus and a SCSI bus. According to one example, the peripheral bus may include a peripheral component interface (PCI) bus. The SCSI adapter may initiate and maintain spin-up power concurrently to a first set of the plurality of SCSI disk drives. Code contained within the computer and specifically within system memory ROM of the computer, monitors spin-up current and spin-up time attributed to each of the first set of SCSI disk drives. The code within system ROM can then apply spin-up power to another of the plurality of SCSI disk drives after the spin-up time of at least one of the first set of SCSI disk drives has elapsed and the cumulative spin-up current attributed to the current and to-be-spun devices will consume less power than a pre-defined current budget of the computer. The first set of SCSI disk drives (i.e., fast spin-up devices) are responsive to a start unit command and immediate bit sent from the SCSI initiator to obtain successive ownership of the SCSI bus and initiate application of the spin-up power to at least one device within the first set before spin-up power to at least one of the first set of SCSI disk drives has ended.

According to another embodiment, a SCSI device is provided. The SCSI device includes any electromechanical SCSI-based device such as, e.g., a disk drive or tape drive. The SCSI device comprises an inquiry page responsive to an inquiry request command issued to the SCSI device. The inquiry page is established within firmware of the SCSI controller or SCSI device and contains a bit indicating if the SCSI device supports a command to release control of a SCSI bus to which the SCSI device is connected before the SCSI device completes an initial power-up routine. According to a preferred example, the power-up routine is a spin-up routine and involves applying transitory power to initiate rotation of an electromechanical device. The spin-up power consumed by the device is greater than that after which the spin-up is completed and during steady state movement of the electromechanical device.

According to yet another embodiment, a method is provided for reducing spin-up time of a plurality of SCSI disk drives. The method includes reading an inquiry page associated with each of the plurality of SCSI disk drives and categorizing the plurality of SCSI disk drives into a first and second category of SCSI disk drives. The SCSI disk drives fall within the first category if a fast spin-up bit is set within its associated inquiry page. Spin-up current is then imparted and maintained to each of the first set within the first category of SCSI disk drives. Thereafter, spin-up current can be applied to additional SCSI disk drives within the first category if a cumulative spin-up current attributed to the first set plus the added disk drive is less than a pre-defined amount or if a spin-up time attributed to any of the first set of SCSI disk drives elapses. The second category of SCSI disk drives, or legacy disk drives, can receive spin-up current either (i) after all the fast spin-up SCSI disk drives have completed spinning-up or (ii) after all of the fast spin-up SCSI disk drives have completed spin-up except for those having a cumulative spin-up current less than a pre-defined amount.

BRIEF DESCRIPTION OF THE DRAWINGS

Other objects and advantages of the invention will become apparent upon reading the following detailed description and upon reference to the accompanying drawings in which:

FIG. 2 is an inquiry page table contained within a SCSI target, according to one embodiment, wherein the inquiry page is responsive to a read inquiry page command and includes bits indicating whether the SCSI target supports fast spin-up mode and, if so, further indicates an amount of time needed to spin-up the SCSI target and the current consumed by the SCSI target during spin-up;

FIG. 3 is a start up unit command containing an immediate bit which causes the selected SCSI initiator to release control of the SCSI bus during SCSI target spin-up for all SCSI targets which support fast spin-up mode;

Figure 1:
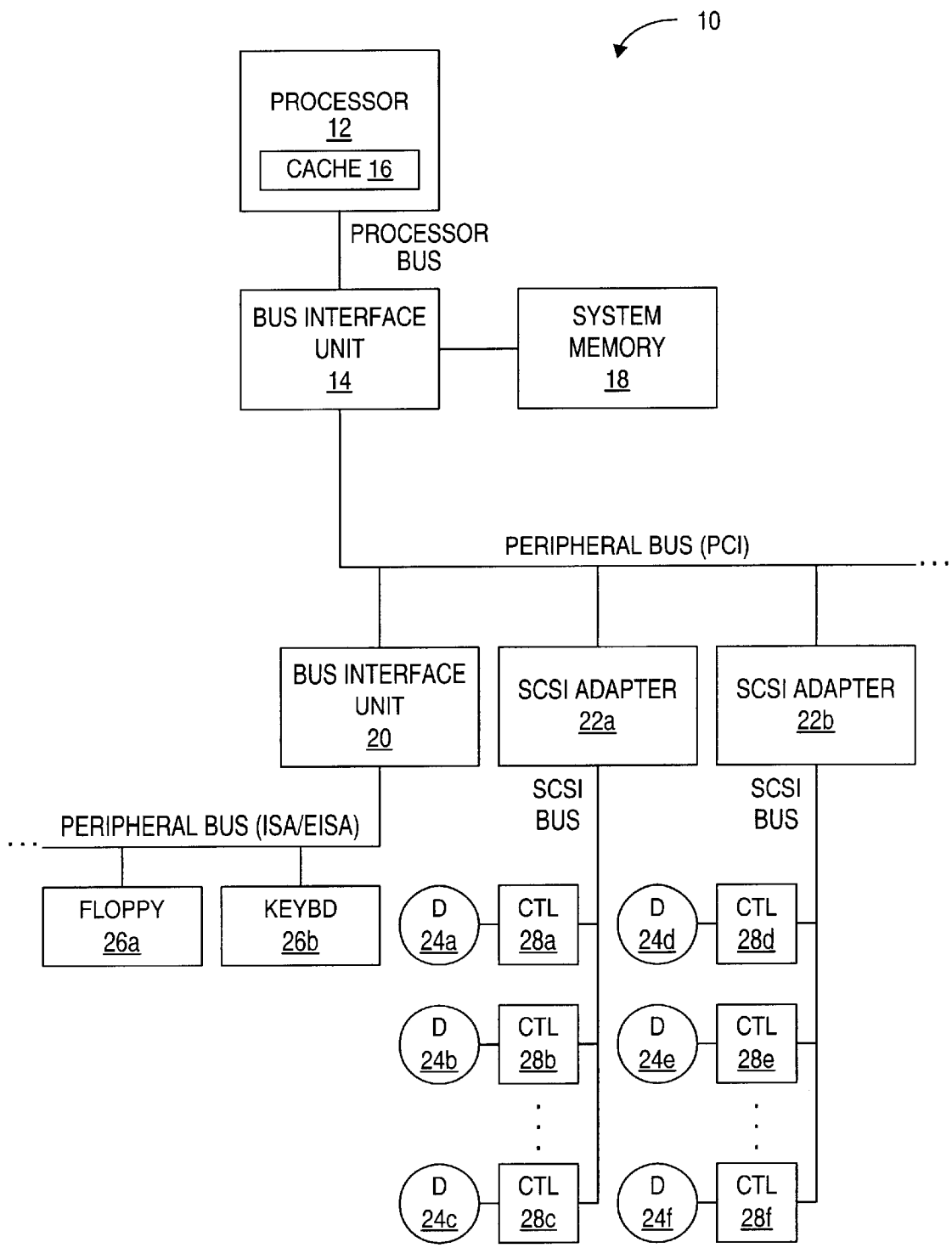
FIG. 1 is a block diagram of a computer system comprising various buses and bus interface units.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, FIG. 1 illustrates a computer 10 having multiple buses, including a processor local bus, a mezzanine or PCI bus, and a peripheral bus or ISA/EISA bus. The processor bus connects a processor 12 to a bus interface unit or northbridge 14. Cache memory 16 is preferably embodied within processor 12 and/or linked to processor 12 by the processor bus. Bus interface unit 14 provides an interface between components clocked at dissimilar rates. Bus interface unit 14 preferably contains a memory controller which allows communication to and from system memory 18. A suitable memory 18 comprises RAM and ROM. Interface unit 14 may also include a graphics port to allow communication to a graphics accelerator associated with an electronic display. A suitable display includes a cathode ray tube (CRT), a liquid crystal display (LED), etc.

Unlike the processor bus which runs at speeds comparable to processor 12, PCI bus generally runs at speeds of e.g., 33 MHz or lower. Another bus interface unit 20, or southbridge, is shown coupled between two dissimilar peripheral buses (i.e., the PCI bus and the ISA/EISA bus). Similar to unit 14, bus interface unit 20 is an ASCI or group of ASCIs that provide connectivity between various buses, and may also include system functions which can possibly integrate one or more serial ports, Attributed to the PCI bus are input/output (I/O) devices. For example, the I/O devices attributed to the PCI bus can be SCSI devices 24 coupled to the PCI bus via a SCSI bus and associated SCSI adapter 22. SCSI devices 24 generally operate at higher speeds than I/O devices 26 attributed to the ISA or EISA bus. Examples of such devices 26 are shown as a floppy disc drive, a keyboard, etc.

SCSI devices 24 operate according to well-known SCSI-I or SCSI-II bus protocol. Devices 24 can include any electromechanically driven device, such as a disk drive motor or a tape drive motor. Controllers 28 are commonly embedded in the same housing as their associated, electromechanically driven device and are thereby powered by embedded power supplies operating from switched AC power sources. The power source is provided through the SCSI bus as a common power conductor. As will be described herein below, transitory current draw from a SCSI device load will adversely affect the power supply amount forwarded to other SCSI device loads. Fortunately, transitory changes in current draw occur primarily when power is first applied to the SCSI device (i.e., during spin-up). After the electromechanical motor has achieved spin-up status, the motor maintains its constant rotational speed. This causes a constant current draw by the electromechanical device, whereby the device is said to be in the "steady-state" condition where fluctuations in load current are minimal. The amount of time and momentum needed to achieve and/or impart steady state rotational movement can be considerable. Each device and/or associated controller 24 and 28, respectively, includes firmware which can be set by the manufacturer to indicate the amount of current that the device would draw during spin-up, and the amount of time needed to achieve constant revolution from a standstill position (i.e., the idle time or spin-up time). Additionally, firmware exists for noting whether the particular device and/or controller supports fast spin-up.

FIG. 2 illustrates an inquiry page 30 which can be established within firmware of each device and/or controller. Inquiry page 30 includes many fields, and is accessible by a command issued from a ROM-based code within the system memory via the SCSI adapter and SCSI bus. A command which requests the SCSI inquiry page can be at page code D0$h$. Included with the numerous fields within inquiry page 30 is an 8-bit field 32 reserved for indicating the maximum spin-up current which the SCSI device will consume during spin-up activity. The next 8-bit byte is reserved to indicate the optimal idle time or spin-up time of that device, as shown by reference numeral 34. Both the maximum spin-up current 32 and the optimal idle time 34 can represent their respective values with relatively high resolution provided by the 8-bit code. For example, current 32 can be indicated in 0.1 ampere increments as specified for a 12-volt operational SCSI device. Likewise, idle time 34 can be specified in possibly 0.1 second increments, when considering no error recovery and assuming a 12-volt current profile.

Also illustrated in inquiry page 30 is a fast start up (FSU bit 36 reserved to indicate if the SCSI device supports fast spin-up. More specifically, if bit 36 is set, the SCSI initiator will note that the target will begin spin-up and need not wait until spin-up has completed before releasing the SCSI bus. This means that the initiator, or master, can immediately release ownership of the SCSI bus to allow another initiator and target to begin their spin-up routine without waiting for the previous target to complete its spin-up routine. Bit 36, when set, indicates to the initiator and more specifically to system firmware within the computer system memory, or ROM, that the associated SCSI device or controller should be categorized as a fast spin-up device as opposed to one which must wait until the previous device has spun-up before beginning its spin-up operation (i.e., a legacy device).

Inquiry page 30 is generally well-known except for the modified bits implemented herein, and set forth as reference numerals 32–36. The remaining fields, i.e., page length queue depth, etc., are generally recognized as conventional fields within the device inquiry page firmware.

The firmware associated with inquiry page 30 can be established in many ways. For example, a ROM can be established within the controller or device, with trace conductors established during manufacture of that ROM. Alternatively, fuses can be blown or jumpers set in the field. Still further, DIP switches can be moved by the operator to set the bits indicating the unique configuration of that device and to establish the field codes 32–36.

In addition to establishing the unique field codes which indicate fast spin-up capability, spin-up current and idle time, other jumpers or DIP switches can be set to establish a unique identifying number for each of the various SCSI devices. Thus, when a device, called the initiator, wants to access the SCSI bus, it will wait until the bus is free and then identifies itself by sending a signal down one of the SCSI data lines. In this manner, the initiator will arbitrate for the SCSI bus using a fixed arbitration scheme where each SCSI device (including the adapter) is noted as being associated with one of the eight or sixteen data lines of the SCSI bus. Once the initiator is given ownership, the initiator transmits a signal down another SCSI data line corresponding to another SCSI device, called the target, to which the initiator wants to interact with. Thus, the eight (or sixteen) data lines in the SCSI connection allows the unique identification of one-of-seven (or one-of-fifteen) SCSI target and one SCSI initiator. Accordingly, before data transfer can take place, the SCSI initiator must arbitrate and gain ownership, and the target must be selected through an arbitration and selection phase. The initiator, when given SCSI bus mastership, drives a unique SCSI identification bit on the SCSI bus corresponding to the identification bit of a unique SCSI target placed within the firmware of that target.

After the arbitration and selection phases, information can be transferred during a transfer phase. That information includes a start unit command 40 shown in FIG. 3. Command 40 having an Op-code 1Bh includes numerous fields normally recognized in SCSI bus protocol, except that a new field is implemented to take advantage of fast start up devices (i.e., devices having the fast start up bit set). The start unit command 40 can be sent from firmware within system memory of the computer, and included with that firmware is a mechanism for checking all of the inquiry pages to determine which devices have the fast start up bit set in their inquiry pages. For those devices, the system memory ROM will initiate a POST operation by setting an immediate bit 42 within the start unit command 40. Immediate bit 42 signals the SCSI target to immediately return a status as to whether the target received the start unit command 40. Thus, instead of waiting for the operation associated with the start unit command to end (i.e., instead of waiting for spin-up to complete), the immediate bit allows the initiator to note that the start unit command has been received and that it can terminate the transfer phase without waiting for spin-up to elapse. This means that an idle state is placed on the SCSI bus to enable arbitration, selection, and transfer of another start unit command 40 to another SCSI device.

In a conventional setting, the start unit command is forwarded without the immediate bit set. This means that the transfer phase must extend until a test unit ready command is sent back from the target indicating that spin-up is complete. Contained within the SCSI specification is the test unit ready command and response thereto. Various responses, such as a "good" response/status indicates the condition of the target—i.e., whether spin-up is complete and the target is ready to receive data. Accordingly, the time between forwarding the start unit command and receiving a test unit ready response can be quite long, and for the benefits described herein, is avoided in devices which support fast start up. Even if a disconnect command is set from the initiator before the target returns a test unit ready response, the disconnect command and the timing of that command, is difficult to derive. Primarily, the disconnect command and/or feature of SCSI devices implies that the system firmware or ROM contain code that is relatively complex to implement. That is, the ROM must know when to send the disconnect command relative to the start unit command and subsequent test unit ready responses. Additionally, the code must know which devices have received disconnect and which devices should receive disconnect. A more simple solution would be to employ a firmware modification within the inquiry page, and utilizing that modification to implement system firmware modification within the computer system memory which keeps track of fast start up devices and forwards an immediate bit for those devices.

Figure 4:
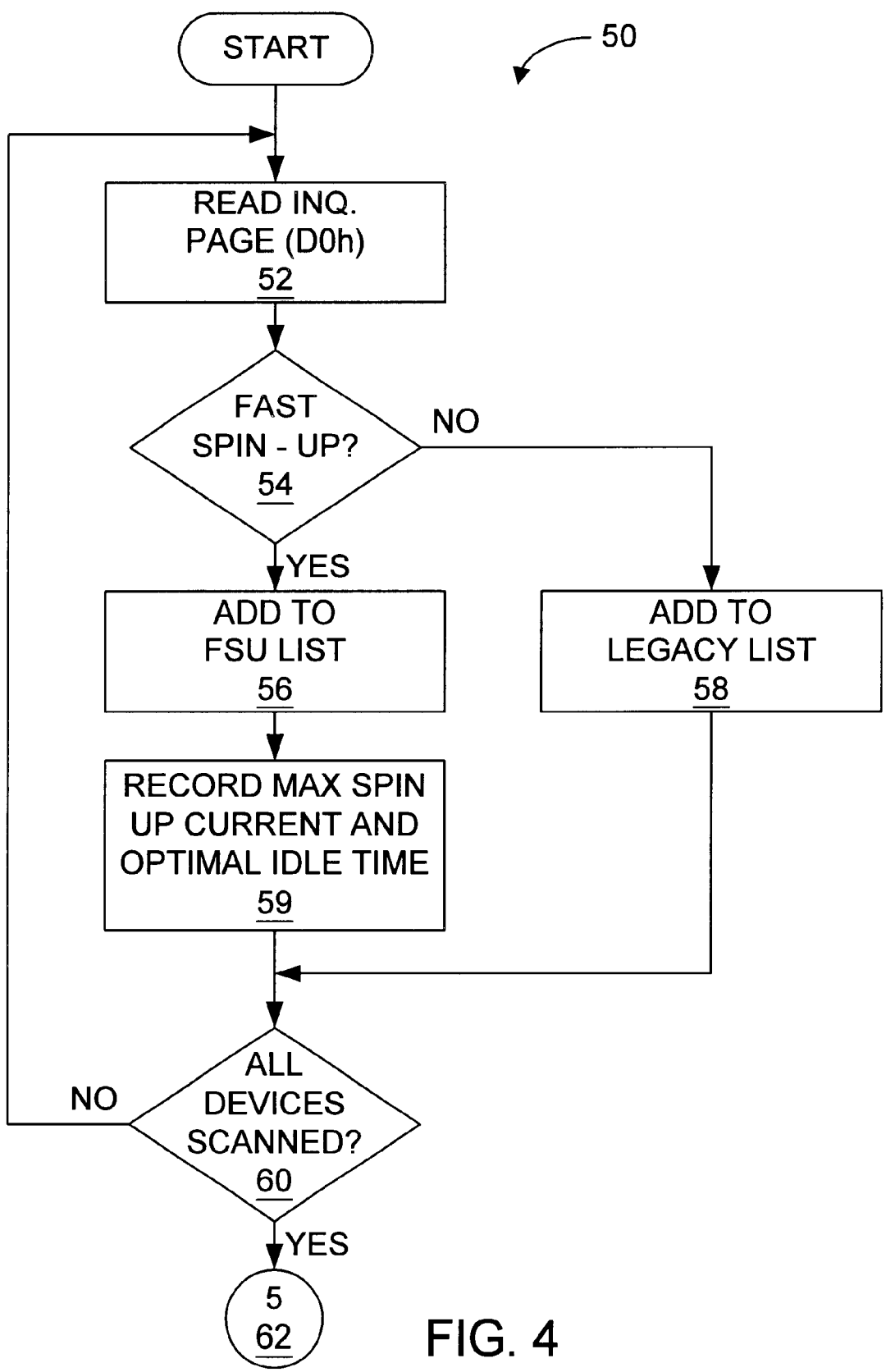
FIG. 4 is a flow diagram of code contained within system memory of the computer shown in FIG. 1, wherein the code compiles a list of SCSI devices which support fast spin-up and devices which do not support fast spin-up (i.e., legacy devices), and attributes spin-up times and spin-up current from the inquiry page table to devices within the fast spin-up list.
Figure 5:
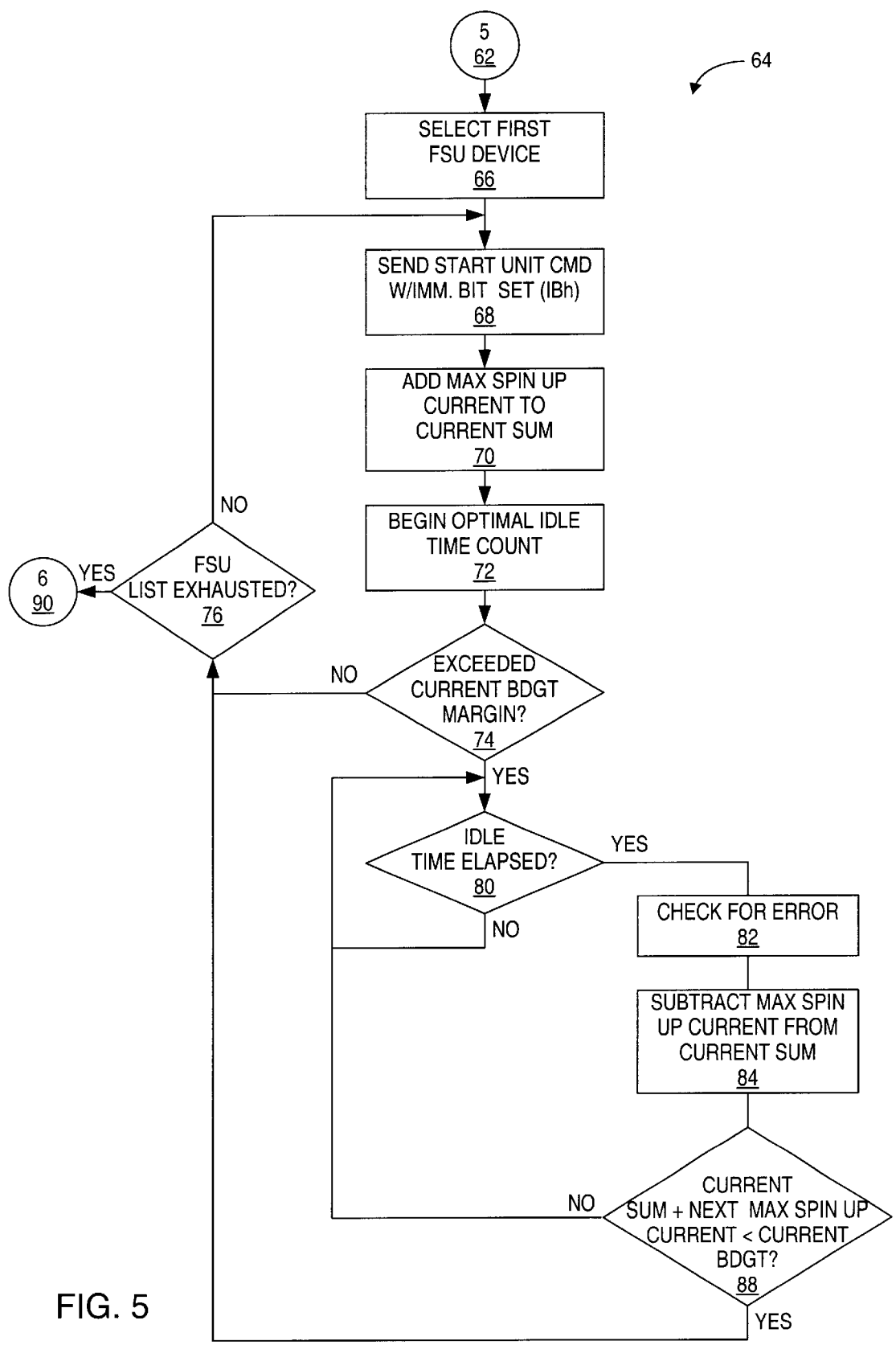
FIG. 5 is a flow diagram of code used to apply spin-up power concurrently to several fast spin-up devices based on estimates of cumulative current draw of those devices relative to a current budget of the computer, and for applying spin-up power to additional fast spin-up devices based on estimates of when the previous fast spin-up devices have completed spin-up.
Figure 6:
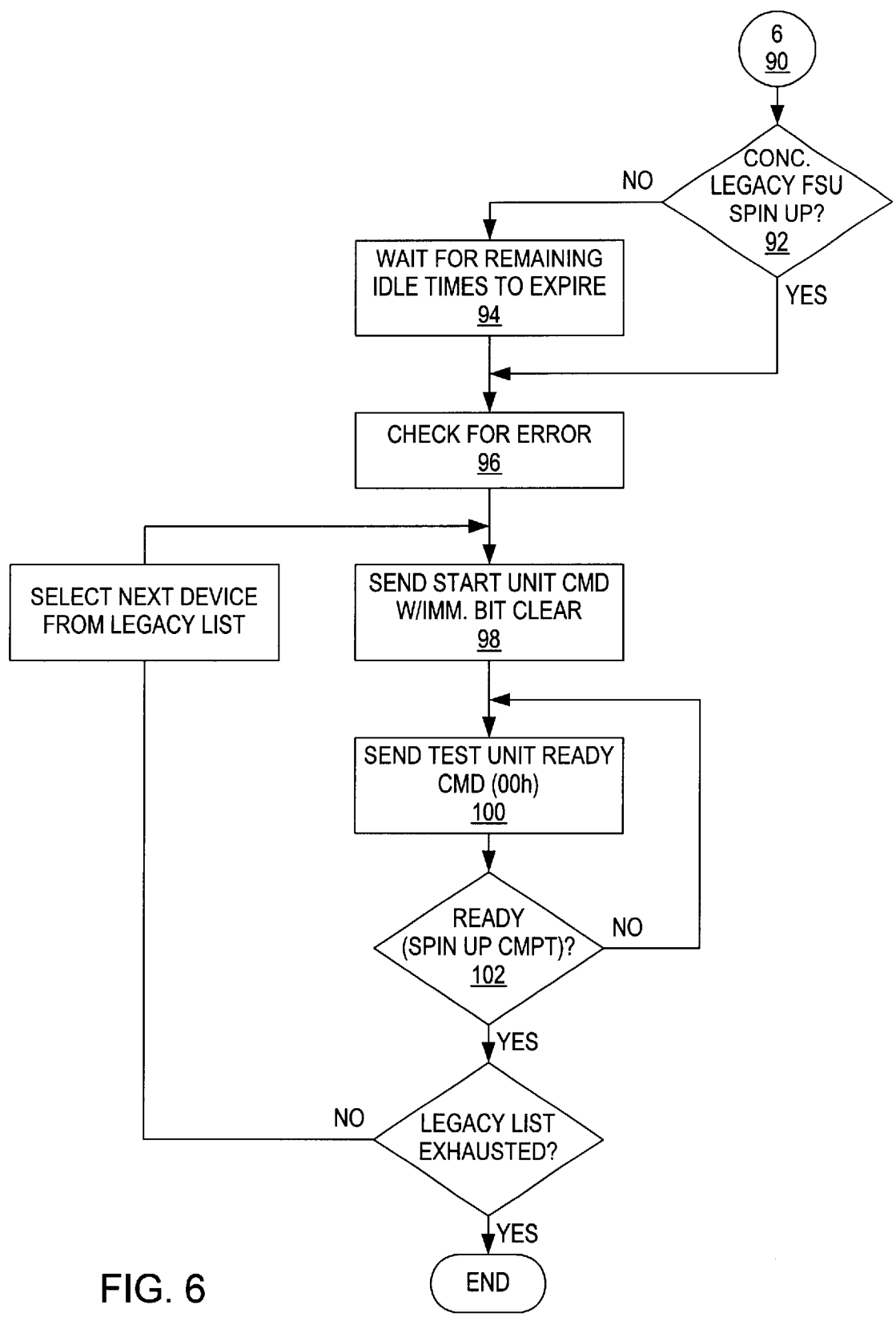
FIG. 6 is a flow diagram of code used to apply spin-up power sequentially to non fast spin-up devices as the fast spin-up devices are completing their spin-up, or after all of the fast spin-up devices have completed their spin-up.

FIGS. 4–6 indicate a flow diagram of code contained within the system memory ROM. Specifically, FIG. 4 illustrates code 50 used to establish a list of fast start up devices and legacy devices by scanning the inquiry page of each SCSI device. FIG. 5 illustrates code used to concurrently spin-up multiple fast spin-up devices until all devices within the fast spin-up list have reached steady-state spin revolution per minute ("RPM"). FIG. 6 illustrates code used to sequentially spin-up legacy devices after the fast spin-up devices have been at least partially, if not completely, spun-up.

Referring to FIG. 4, code 50 is shown to include multiple steps carried out by the computer system. First, inquiry pages of each SCSI device 52 is read. Depending on whether the fast spin-up bit is set, a determination is made as to whether each of those inquiry pages support fast spin-up 54. If so, that particular device identification number is noted as a device which is added to the fast spin-up list 56. If not, that device is added to a legacy list 58. For all devices within the fast spin-up list 56, the maximum spin-up current and optimal idle times are recorded and maintained within system memory as shown by step 59.

A determination must then be made as to whether all SCSI devices have been scanned 60. If not, then the next SCSI device which has not been scanned must be read via its inquiry page. If all devices have been scanned, then the process of concurrently spinning multiple fast spin-up devices is begun at step 62 shown in FIG. 5. It is important to note that compiling the fast spin-up list is easily achieved by arbitrating and selecting each device one-by-one, and then transferring a command to read the inquiry page during the transfer phase. The inquiry page can be quickly read and the transfer phase completed, thereby allowing rapid arbitration and selection of another device on the bus.

FIG. 5 illustrates code 64 implemented by the computer system firmware or ROM. Code 64 is shown as a flow diagram of steps whereby the first fast spin-up device within the fast spin-up list is selected 66. A start unit command is set to that first device with the immediate bit set 68. The maximum spin-up current associated with that device is then added or accumulated by the processor ALU and maintained as a current sum within system memory, as shown by step 70. Additionally, the optimal idle time counter is begun for that first device 72.

A decision is then made regarding that first device. Specifically, the accumulated current stored in system memory is compared against a pre-defined current budget as shown at decision block 74. The current budget is the maximum allowable current which can be consumed by the computer system, including the various components connected to buses of that system. The system is that shown in FIG. 1, and includes SCSI devices connected to the SCSI bus. Accordingly, the maximum allowable current draw afforded by those devices is used to establish the current budget. If the current draw exceeds the current budget, then problems may exist in the form of voltage regulation problems on the SCSI power conductor. For this reason, a margin or threshold is established slightly below the maximum allowable current budget. Once the accumulated spin-up current exceeds that margin slightly below the maximum allowable limit for the computer system, then a signal is forwarded which indicates that spin-up of additional fast spin-up devices is not to be undertaken. However, if the accumulated current is still below that margin, then a check is performed to determine if the fast spin-up list is exhausted 76. If it is not exhausted, then another fast spin-up device spin-up operation is begun by repeating steps 68, 70, and 72.

If it is determined the accumulated current is above the current budget margin, then no additional fast spin-up devices can undergo spin-up until the idle time or spin-up time of at least one device currently undergoing spin-up has terminated. Thus, the spin-up time or idle time must be checked at step 80. If the idle time or spin-up time is terminated (i.e., indicating constant and non-accelerated spinning of the SCSI device), then steps 82 and 84 are undertaken. Unless a spin-up time or idle time of a fast spin-up device has elapsed, no additional fast spin-up devices can undergo spin-up.

Step 82 is optional. Specifically, a test unit ready command may be sent to determine if the spin-up process has completed. However, it is not necessary that the test unit ready command be send, and possibly this command can be stalled until after all fast start up devices have completed their spin-up routine. Thus, step 82 may be avoided in FIG. 5 and instead, be used at the culmination of all fast spin-up device spin-up operations.

The device whose idle time or spin-up time has elapsed based on the counter counting down the idle time read from the inquiry page, the spin-up current attributed to that device is subtracted from the accumulated current in step 84. Thereafter, a determination must be made as to whether the existing accumulated current sum will exceed the pre-defined current budget if the spin-up current of the next fast spin-up device when added to the accumulated current will exceed the current budget. That determination is made at step 88. If the accumulated current added to the next maximum spin-up current value exceeds the pre-defined current budget, then it is necessary that the spin-up time of another fast spin-up unit expires. However, if the accumulated current added to the next fast spin-up current is less than the current budget, then another fast spin-up device can begin its spin-up operation. Again, however, determination must be made as to whether all fast spin-up devices from the list have been exhausted before the next fast spin-up device can undergo spin-up. If the fast spin-up list has been exhausted, then legacy devices can begin their spin-up as shown by reference 90.

Reference 90 indicates a starting step in FIG. 6, where a determination can be made as to whether legacy devices can concurrently spin-up with the remaining fast spin-up devices 92. If it is desirable to wait until all the fast spin-up devices complete their spin-up, then step 94 is employed. However, it may not necessarily be most optimal to wait until all fast spin-up devices have completed their spin-up procedure before starting spin-up on at least a few of the legacy devices. For example, the accumulated current of possibly only a remaining two or three fast spin-up devices may be substantially less that the current budget. In this case, spin-up of the first legacy device can be undertaken while the remaining fast spin-up devices are undergoing spin-up operation.

Regardless of whether the first and possibly second legacy device is undergoing spin-up with the latter few fast spin-up devices, it may be desirable at this juncture to determine if the spin-up process of the fast spin-up devices have actually completed their spin-up operations. This check is performed at block 96 by arbitrating for the SCSI bus and selecting a fast spin-up device which can receive a test unit ready command well recognized in the SCSI bus protocol. If a status or response of "good" is returned, then it is known that the particular device has completed spin-up. This checking process can be undertaken for each device within the transfer phase of the SCSI bus protocol.

Once it is determined that the previously employed fast spin-up devices have completed their spin-up operations, then the legacy devices taken from the legacy list can sequentially undergo spin-up procedures by sending the start unit command with the immediate bit clear to the first legacy device within the legacy list 98 and then monitoring to see if the spin-up has completed on that device by sending the test unit ready command 100. If a ready or "good" response ensues 102, then it is known that the legacy device has completed its spin-up operation. If not, then the test unit ready command is repeated, as shown.

The aforementioned process is completed on each and every legacy device within the legacy list by selecting the next legacy device from that list and sending the start unit command and monitoring its spin-up operation by sending a test unit ready command and returning a ready or good status. Once the legacy list is exhausted as shown by decision 104, then it is known that all devices have completed their spin-up routine, first by spinning-up a subset of the fast spin-up devices concurrently, and then initiating spin-up on additional fast spin-up devices depending on where the accumulated current is relative to the maximum current budget. Once at least most if not all the fast spin-up devices have completed their spin-up routine and are in steady-state or constant spin velocity, then the legacy devices are spun-up in sequence, one after the other.

Figure 7:
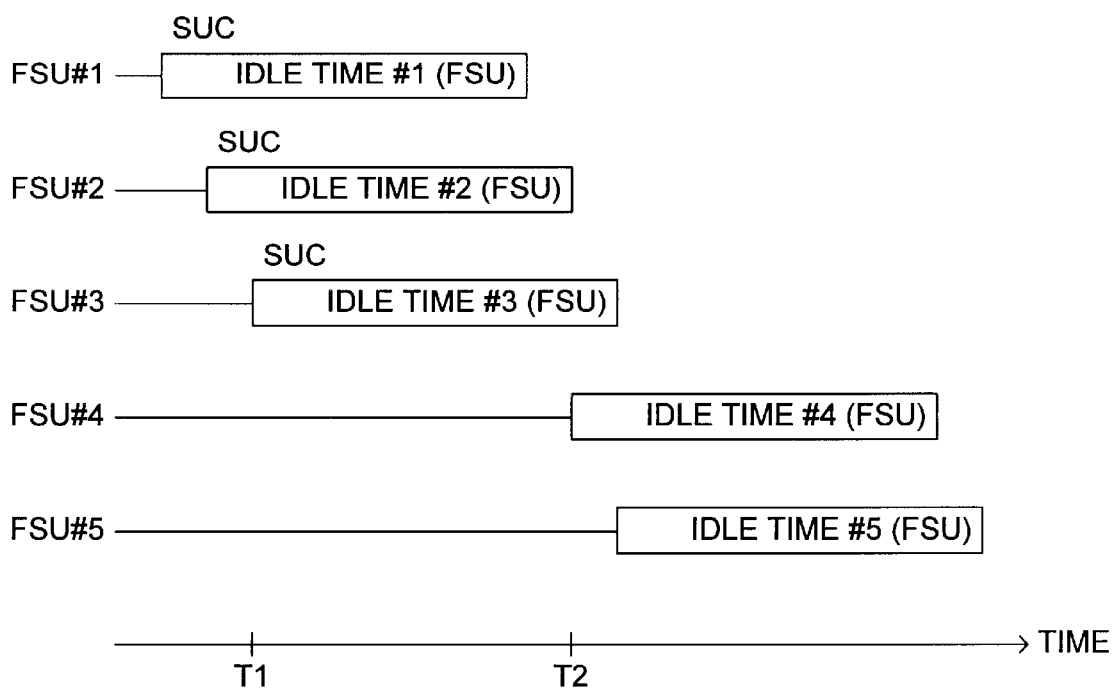
FIG. 7 is a timing diagram of power applied to multiple fast spin-up devices to allow those devices to spin-up concurrently, and power thereafter applied to subsequent fast spin-up devices once at least one previous fast spin-up device has completed its spin-up routine.

FIG. 7 illustrates the benefit of initiating the start unit command for fast spin-up device 1 ("FSU#1"), fast spin-up device 2 ("FSU#2"), and fast spin-up device 3 ("FSU#3") within the list of fast spin-up devices. As shown, the start unit command issued during the transfer phase is undertaken to initiate spin-up for device #2 while the first device is still undergoing spin-up. Thus the second device need not wait for spin-up of the first device to conclude by it returning a start unit ready status. The same applies for fast start up unit #3, which can begin at time T1, concurrent with spin-up operations of devices#1 and #2.

Fast start up device #4, however cannot begin its spin-up routine until after time T2 since, at times prior to T2, the current associated with spinning-up devices #1, #2, and #3 exceeds the current budget margin. It is therefore not until after the idle time or spin-up time of device #1 (i.e., at time T2) that the next (fast start up device #4) can begin its spin-up routine. Likewise, device #5 cannot begin its spin-up routine until after device #3 has completed its spin-up routine, since the cumulative current consumed by devices #2, #3, and #4 exceeds the current budget thereby requiring device #3 to culminate its current draw before allowing spin-up of device #5.

It will be appreciated to those skilled in the art having the benefit of this disclosure that the embodiments described herein are believed to be capable of describing a SCSI device power initialization operation, whereby electromechanical motors of multiple SCSI devices can be initiated from zero RPM to a constant RPM in the least amount of time given the current budget of the SCSI subsystem and/or computer system. Various modifications and changes may be made as would be obvious to a person skilled in the art having the benefit of this disclosure. It is intended that the following claims be interpreted to embrace all such modifications and changes and, accordingly, the specification and drawings are to regarded in an illustrative rather than a restrictive sense.

What is claimed is:

1. A computer, comprising:
   a SCSI bus;
   a plurality of SCSI disk drives coupled to the SCSI bus, wherein a first set of the plurality of SCSI disk drives supports a command to release control of the SCSI bus to which the SCSI drive is connected before the SCSI drive completes an initial power up routine; and a SCSI adapter coupled between a peripheral bus and the SCSI bus for maintaining spin-up power concurrently to the first set of the plurality of SCSI disk drives.

2. The computer as recited in claim 1, further comprising code contained within the computer for monitoring spin-up current and spin-up time attributed to each of the first set of SCSI disk drives.

3. The computer as recited in claim 2, wherein the code is operatively coupled to the SCSI bus for applying spin-up power to another of the plurality of SCSI disk drives after the spin-up time of at least one of the first set of SCSI disk drives has elapsed.

4. The computer as recited in claim 2, wherein the code is operatively coupled to the SCSI bus for applying spin-up power to another of the plurality of SCSI disk drives if the cumulative spin-up current attributed to the first set of SCSI disk drives is less than a pre-defined current budget of the computer.

5. The computer as recited in claim 2, wherein the number of said first set of SCSI disk drives is dependent on whether a cumulative spin-up current attributed to the first set of SCSI disk drives exceeds a pre-defined current budget of the computer.

6. The computer as recited in claim 1, wherein said first set of SCSI disk drives are responsive to a command sent from the SCSI adapter to obtain successive ownership of the SCSI bus and initiate application of the spin-up power to the first set of SCSI disk drives before spin-up power to at least one of the first set of SCSI disk drives has ended.

7. The computer as recited in claim 1, wherein the spin-up power comprises power necessary to impart rotational movement upon the first set of SCSI disk drives.

* * * * *